(12) United States Patent
Bildstein et al.

(10) Patent No.: US 6,644,773 B2
(45) Date of Patent: Nov. 11, 2003

(54) METHOD, SYSTEM, AND ARTICLE OF MANUFACTURE FOR PERFORMING REGISTRATION CALIBRATION FOR PRINTING DEVICES

(75) Inventors: Carl Robert Bildstein, Superior, CO (US); Jennifer Quirin Trelewicz, Superior, CO (US); Joan LaVerne Mitchell, Longmont, CO (US); Arthur Kenneth Ford, Longmont, CO (US); Michael Thomas Brady, White Bear Lake, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/098,649

(22) Filed: Mar. 15, 2002

(65) Prior Publication Data

US 2003/0174184 A1 Sep. 18, 2003

(51) Int. Cl.⁷ .............................................. B41J 29/393
(52) U.S. Cl. ...................... 347/19; 101/211; 101/486; 358/406; 358/509; 382/112; 399/15; 347/116
(58) Field of Search ................................ 101/485, 486, 101/211, 248; 358/406, 504; 347/14, 107, 116; 382/112; 399/15, 72

(56) References Cited

U.S. PATENT DOCUMENTS

| | | | | |
|---|---|---|---|---|
| 4,265,556 A | * | 5/1981 | Krieg et al. ................ 400/342 |
| 4,401,024 A | * | 8/1983 | Frentress .................. 101/93.1 |
| 4,731,634 A | * | 3/1988 | Stark ....................... 399/232 |
| 4,804,979 A | | 2/1989 | Kamas et al. ............... 347/116 |
| 4,808,832 A | | 2/1989 | Doggett ..................... 250/548 |
| 4,965,597 A | | 10/1990 | Ohigashi et al. ............ 347/118 |
| 5,231,677 A | * | 7/1993 | Mita et al. .................. 382/22 |
| 5,319,537 A | | 6/1994 | Powers et al. ............... 347/232 |
| 5,321,434 A | | 6/1994 | Strauch et al. .............. 347/232 |
| 5,367,319 A | * | 11/1994 | Graham ....................... 347/2 |
| 5,388,517 A | * | 2/1995 | Levien ....................... 101/485 |
| 5,499,093 A | | 3/1996 | Aerens et al. .............. 355/326 R |
| 5,828,937 A | | 10/1998 | Aerens et al. .............. 399/301 |
| 5,857,784 A | * | 1/1999 | Allen ......................... 400/74 |
| 5,909,235 A | | 6/1999 | Folkins ..................... 347/240 |
| 5,992,973 A | | 11/1999 | Wen ........................... 347/43 |
| 6,065,400 A | * | 5/2000 | Van Weverberg ........... 101/181 |
| 6,076,915 A | * | 6/2000 | Gast et al. ................... 347/19 |
| 6,109,722 A | * | 8/2000 | Underwood et al. ......... 347/19 |
| 6,150,231 A | * | 11/2000 | Muller et al. .............. 438/401 |
| 6,164,847 A | * | 12/2000 | Allen ......................... 400/74 |
| 6,198,490 B1 | | 3/2001 | Eom et al. ................. 347/116 |
| 6,198,549 B1 | * | 3/2001 | Decker et al. ............. 358/504 |
| 6,390,587 B1 | * | 5/2002 | Subirada .................... 347/19 |
| 2002/0063871 A1 | * | 5/2002 | Kinas ........................ 358/1.4 |

FOREIGN PATENT DOCUMENTS

| | | | |
|---|---|---|---|
| EP | 895869 A2 * | 2/1999 | ............ B41J/19/14 |
| JP | 1141746 | 6/1989 | |
| JP | 6171069 | 6/1994 | |
| JP | 8192524 | 7/1996 | |

OTHER PUBLICATIONS

Liu, Xiangdong. "Analysis and Reduction of Moire Patterns in Scanned Halftone Pictures." Dissertation submitted to the faculty of Virginia Polytechnic Institute and State University, May 1996, pp. 1–206.

* cited by examiner

Primary Examiner—Judy Nguyen
Assistant Examiner—Blaise Mouttet
(74) Attorney, Agent, or Firm—Konrad Raynes Victor & Mann LLP

(57) ABSTRACT

Provided are a method, system, and an article of manufacture for registration calibration of a printer. An application prints reticle patterns on a printed page. An imaging device creates a digital image of the printed reticle patterns. If color registration on the printer is improper, the digital image exhibits interference patterns. The application compares the interference patterns to the reticle patterns, and based on the results of the comparison adjusts the color registration of the printer.

38 Claims, 5 Drawing Sheets

METHOD, SYSTEM, AND ARTICLE OF MANUFACTURE FOR PERFORMING REGISTRATION CALIBRATION FOR PRINTING DEVICES

BACKGROUND OF THE INVENTION

1. Field of the Invention

The present invention relates to a method, system, and an article of manufacture for performing registration calibration for printing devices.

2. Description of the Related Art

A color printer may achieve a desired color during printing by overlaying colors, such as cyan, magenta, yellow and optionally black, on top of each other in separate color planes. Achieving proper color registration in a printer involves calibrating the color printer such that the color planes are overlaid precisely on top of each other at every pixel. If a given printer's color is misregistered, improper colors and artifacts may appear on the printed page.

To achieve color registration, a printer first prints one or more predetermined registration marks, such as a pattern of small intersecting lines, on a print medium. Subsequently, an operator examines the printed registration marks and adjusts the printer to compensate for the detected deviations between the printed registration marks and the corresponding predetermined registration marks.

Since color registration of a printer can change during printing, printers may need periodic color registration even while printing a print job. In a high-speed printer that prints a large number of pages continuously, an operator may have to stop a print job to manually adjust the printer. The manual operator adjustments may be augmented by automated color registration by using density measurements of registration marks as described in U.S. Pat. No. 6,198,549 entitled "System, Method, Program and Print Pattern for Performing Registration Calibration for Printers by Measuring Density," which patent is incorporated herein by reference in its entirety. However, density measurements of the registration marks cannot fully correct for color misregistration.

Hence, there is need in the art to provide improved techniques for automated color registration in printers.

SUMMARY OF THE PREFERRED EMBODIMENTS

Provided are a method, system and article of manufacture for registration calibration of an operating printing device. A test pattern is printed on a print medium and an imaging device generates a digital image of the printed test pattern. An interference pattern corresponding to the digital image is analyzed and based on the interference pattern the printing device is calibrated. In one implementation the interference pattern is a Moire pattern. In another implementation, the calibration is performed while continuing to process a print job via the operating printing device, wherein the steps of printing, generating, analyzing, and calibrating are performed repeatedly.

In one implementation analyzing the interference pattern further comprises isolating via edge detection the interference pattern from the digital image. The interference pattern is compared to the test pattern. Based on the comparison, a determination is made as to whether a calibration of the printing device needs to be performed.

In another implementation, the printing device has a plurality of printing stations, wherein the test pattern is printed on the print medium by the plurality of printing stations, wherein the printing stations print with a printing medium, wherein the printing medium is from the group consisting of ink or toner, wherein the printing is with at least colors from the group consisting of cyan, magenta, black, highlight and other colors, and wherein the scanning device generates the digital image of the printed test pattern after the test pattern has been printed by at least two of the printing stations.

Implementations are provided wherein the printing device is from the group consisting of a color printer, a photocopier, a color fax machine, a laser printer, an electrostatic printer and an ink-jet printer, wherein the test pattern is a reticle pattern, wherein the print medium is selected from the group consisting of paper, transparency, fabric, plastics, labels, metal, cardboard, and container, wherein the container is selected from the group consisting of plastic, cardboard and metal, and wherein the imaging device is selected from the group consisting of a scanner and a CCD camera.

The implementations enable automated color registration of a printer during printing. A printer prints reticle patterns on a print medium. If the printer is misaligned, the printed reticle patterns exhibit Moire patterns. The Moire patterns offer rich clues on the nature of the misregistration of the printer, and enable an application to correct for printer misregistration. The implementations also allow for periodic automated color registrations while the printer prints a long job, without stopping the job.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
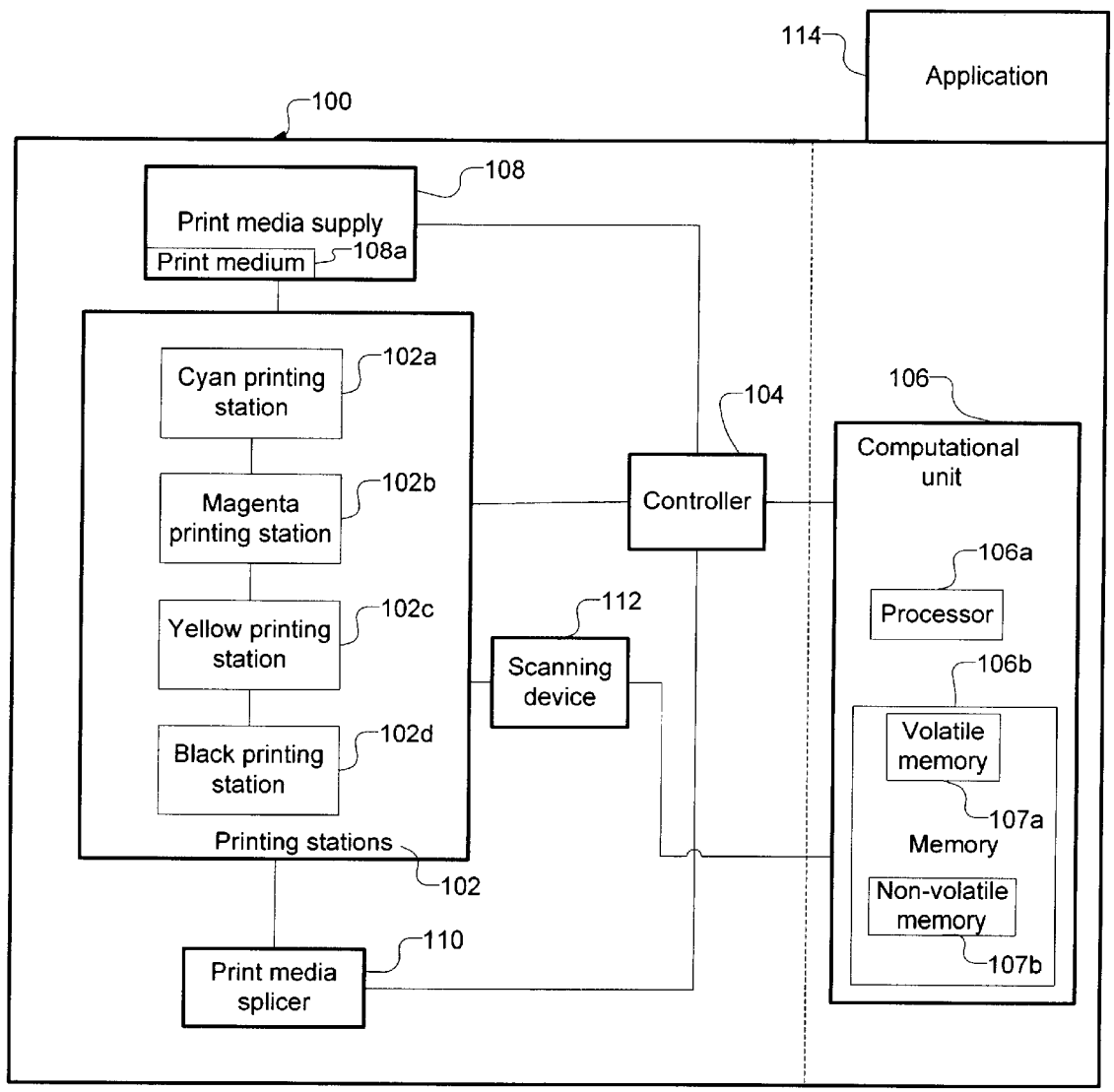
FIG. 1 illustrates a block diagram of a printing environment in which certain described aspects of the invention are implemented.

FIG. 1 illustrates a block diagram of a printing environment in which certain described aspects of the invention are implemented. A color printer 100 includes one or more printing stations 102. The printing stations 102 may include a cyan printing station 102a, a magenta printing station 102b, a yellow printing station 102c, and a black printing station 102d, capable of printing with cyan, magenta, yellow, and black inks or toners respectively.

The printer 100 may be any color printer known in the art including an electrostatic printer, an inkjet printer, a laser printer, a plotter, a network printer, a standalone printer etc. Alternative implements may use other devices that function in a manner analogous to printers such as digital duplicating machines, photocopiers, fax machines etc. While the current implementation describes a trichromatic printer with added black ink or toner, in alternative implementations printer 100 could be a dichromatic printer. Printer 100 could also be a monochromatic printer, if each of at least two monochromatic printers prints one color component. Also, printer 100 could be a monochromatic printer where the reticle-based registration is used for head alignment.

While FIG. 1 shows four printing stations 102a, 102b, 102c, and 102d there may be fewer or more printing stations in alternative implementations. In some implementations, the black printing station 102d may be omitted. The printing stations 102a, 102b, 102c, 102d may also print with inks or toners different from cyan, magenta, yellow and black. While the printing stations 102a, 102b, 102c, 102d are indicated within separate blocks in FIG. 1 the printing stations 102a, 102b, 102c, 102d may be constructed as a single or multiple hardware units. If the printing stations are constructed as a single hardware unit, the single hardware unit may at different times print with a different colored ink or toner.

Printer 100 may also include a controller 104 coupled to a computational unit 106. The computational unit 106 may be any computational unit known in the art, including a processor 106a and a memory 106b. The computational unit 106 may be inside or outside the printer 100. The memory 106b may include volatile memory 107a such as RAM or non-volatile memory 107b such as disk storage. The controller 104 may be implemented in several ways including software, hardware or a combination of software and hardware. The controller 104 may lie within or outside the computational unit 106. In one implementation the controller 104 works cooperatively with the computational unit 106. In some implementations, software or hardware present with the printer 100 may absorb the functions of the controller 104.

The controller 104 may be able to calibrate the printing stations 102, a print media supply 108 and a print media splicer 110, and other components of the printer 100 not shown in FIG. 1. The controller 104 may adjust the timing of the firing of the printing stations 102, to align a printed color plane. The controller 104 may also perform pixel shifts as part of rasterization, i.e. the controller 104 may shift a color plane an integral or fractional number of pixels in memory before printing the color plane.

The print media supply 108 may include a collection of any type of print medium 108a known in the art on which the printer 100 is capable of printing, including paper, transparencies, fabric, glass, plastic, labels, metal, cardboard etc. The print medium 108a may also be a container made up of a variety of material, including plastic, cardboard, metal etc. In one implementation the print medium 108a is a roll of paper. The print medium 108a passes through the cyan, magenta, yellow, and black printing stations 102a, 102b, 102c, 102d. Subsequently, the print media splicer 110 may crop parts of the print medium 108a.

A scanning device 112 is coupled to the printing stations 102 and the computational unit 106. The scanning device 112 may include any scanning device known in the art, including a charge coupled device (CCD) camera, a scanner, or any other imaging device capable of digitizing images printed on the print medium 108a. The scanning device 112 can image the print medium 108a as the print medium 108a moves through the printing stations 102. While FIG. 1 shows only one scanning device, in alternative implementations multiple scanning devices may be positioned to scan the outputs of the cyan, magenta, yellow, and black printing stations 102a, 102b, 102c, 102d. In the current implementation, the scanning device 112 scans the print medium 108a after the four printing stations 102a, 102b, 102c, 102d have printed on the print medium, i.e. a page is scanned after the printer 100 has overlaid all color planes on the page.

An application 114 coupled to the printer 100 may implement aspects of the invention. While the application 114 has been shown in a separate block outside the printer 100, part or all of the functions of the application 114 may be integrated into the computational unit 106, into the controller 104 or into any other unit not illustrated in FIG. 1 such as a printer driver resident on a computational device outside the printer 100.

Figure 2:
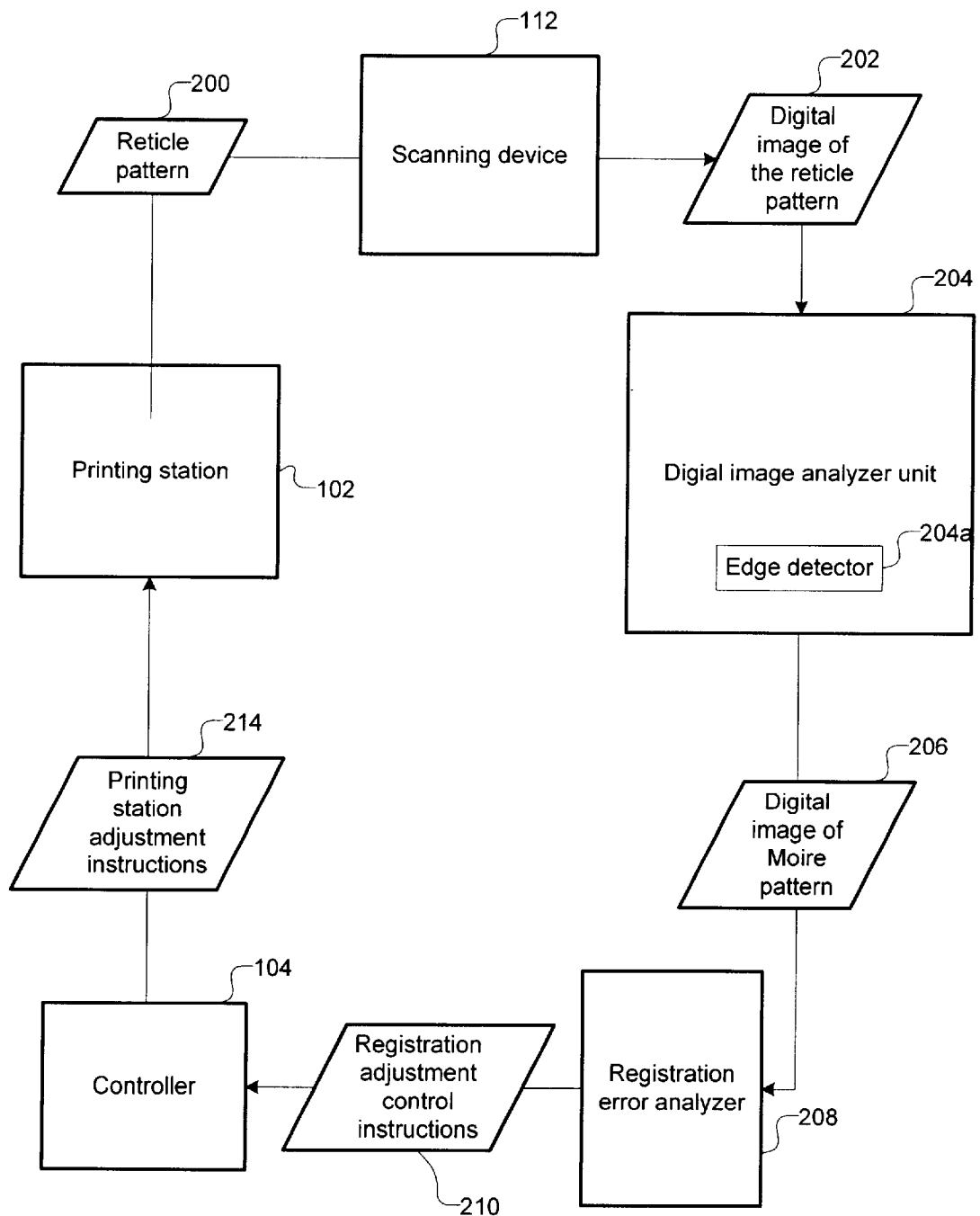
FIG. 2 illustrates a block diagram of software elements, hardware elements, and data structures in which certain described aspects of the invention are implemented.

FIG. 2 illustrates a block diagram of software elements, hardware elements, and data structures in which certain described aspects of the invention are implemented. A reticle pattern 200 is a predetermined marking pattern that is capable of being printed at an appropriate location on the print medium 108a by the printing stations 102. Further details of reticle patterns are described in the publication "Reticles in Electro-Optical Devices" (copyright 1966 by Lucien M. Biberman), which publication is herein incorporated by reference.

The scanning device 112 is capable of digitizing the reticle pattern 200 printed on the print medium 108a and can produce a digital image of the reticle pattern 202. When the printer 100 prints the reticle pattern 200 onto the print medium 108a, if there is color misregistration on the printer 100, the printed reticle pattern 200 may have interference patterns, such as Moire patterns. Moire patterns are patterns of light and dark lines, and the Moire patterns appear when two repetitive patterns of lines, circles, or arrays of dots overlap with imperfect alignment. Moire patterns magnify differences between two repetitive patterns. If two patterns are exactly lined up, then no Moire pattern appears. The slightest misalignment of two patterns will create a large-scale, easily visible Moire pattern. As the misalignment increases, the lines of the Moire pattern appear thinner and closer together. Moire patterns are well known in the art and some applications of Moire patterns in imaging are described in the doctoral dissertation "Analysis and reduction of Moire patterns in scanned halftone pictures" (May 1996, Virginia Polytechnic Institute and State University). In the implementation, Moire patterns may arise because the printer 100 prints the same reticle pattern 200 by overlaying ink or toner from the cyan, magenta, yellow, and black printing stations 102a, 102b, 102c, and 102d respectively. Moire patterns may appear prominently when reticle patterns have comparable intensity values in the different color planes.

FIG. 2 also illustrates a digital image analyzer unit 204 coupled to the printer 100, where the digital image analyzer unit 204 is capable of processing the digital image of the reticle pattern 202 and extracting a digital image of Moire pattern 206 corresponding to the digital image of the reticle pattern 202. The digital image analyzer unit 204 may include an edge detector 204a that determines edges by applying prior art edge detectors such as the Sobel operator, Canney edge operator or other image gradient based operators to the digital image of the reticle pattern 202. The digital image analyzer unit 204 and the edge detector 204a may be implemented in hardware or software, or via a combination of hardware and software.

A registration error analyzer 208 is capable of processing the digital image of the Moire pattern 206 and producing registration adjustment control instructions 210. Analysis of patterns obtained from reticle patterns is well known in the art and described in the publication "Reticles in Electro-Optical Devices" (copyright 1966 by Lucien M. Biberman). The registration adjustment control instructions 210 are instructions for adjusting the components of the printer 100, such as the printing stations 102 and the print media supply 108, that might reduce the incidence of Moire patterns, i.e. the incidence of color misregistration is reduced.

The controller 104 may be capable of processing the registration adjustment control instruction 210, and may produce printing station adjustment instructions 214 to adjust the printing stations 102. The newly adjusted printing stations 102 may print the reticle pattern 200 on the print medium 108a.

Figure 3:
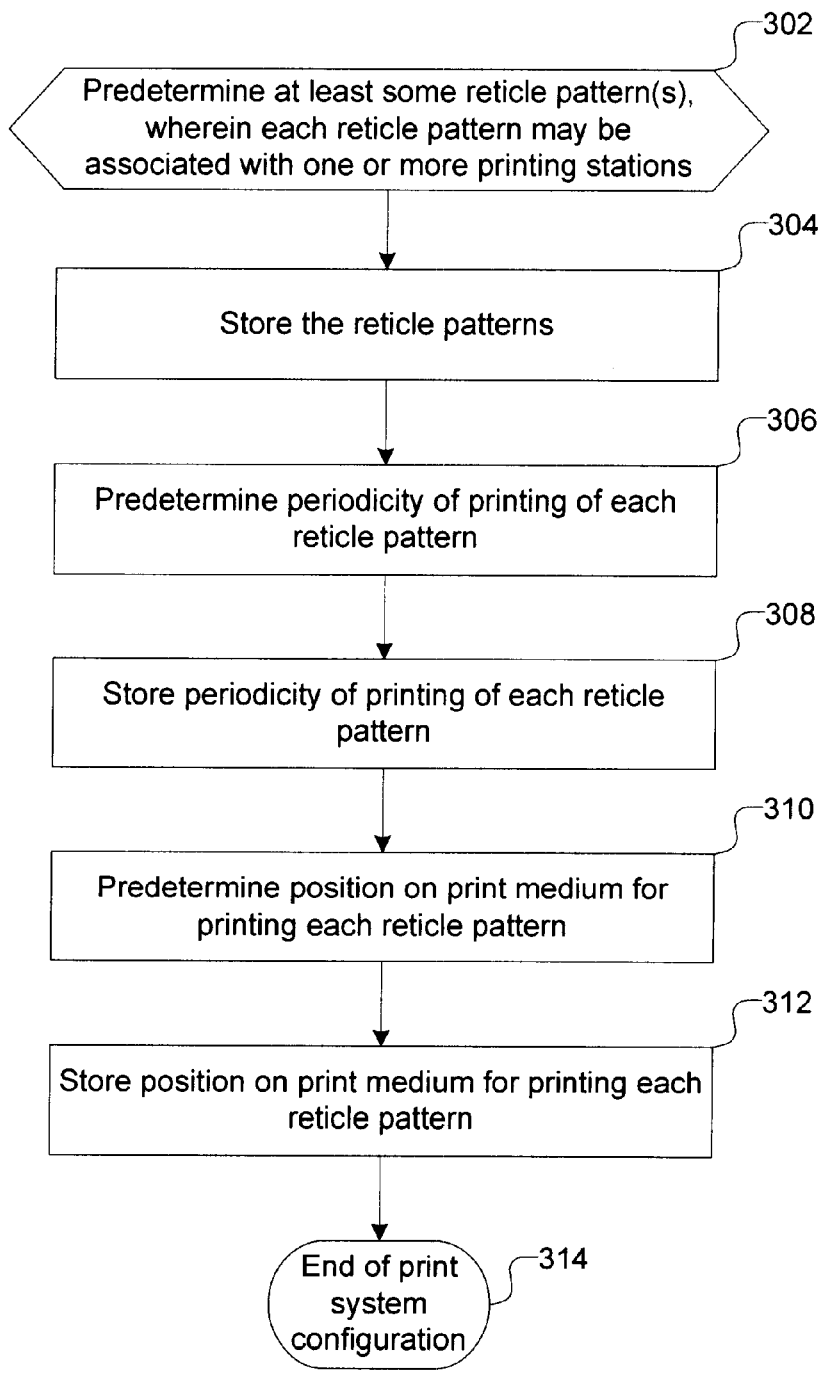
FIG. 3 illustrates logic implemented in an application to configure a print system in accordance with certain described implementations of the invention.

FIG. 3 illustrates logic implemented in an application 114 coupled to the printer 100 to configure the printer 100 in accordance with an implementation of the invention. As stated earlier, the application 114 may reside within the printer 100 or may reside in an external computational device outside of the printer 100 and from the external computational device control the printer 100. At block 302, the application 114 enables an entity (such as an operator, a, programmer, a computer program, a predetermined data file etc.) to enter predetermined reticle patterns 200, where each of the reticle patterns 200 may optionally be associated with one or more printing stations 102. The application 114 stores (at block 304) the reticle patterns 200 in the non-volatile memory 107b. The application 114 may then enable the entity to enter (at block 306) a predetermined periodicity of printing of each reticle pattern 200. The periodicity of printing of each reticle pattern 200 may depend on how frequently printer 100 has to adjust for color-misregistration. At block 308, the application 114 stores the periodicity of printing of the reticle patterns 200 in the non-volatile memory 107b.

The application 114 may then enable the entity to enter (at block 310) the predetermined positions on print medium 108a for printing each reticle pattern 200. Control proceeds to block 312, where the printer 100 stores the positions in non-volatile memory 107b. Control proceeds to block 314 where the print system configuration ends.

In alternative implementations, the entire logic of FIG. 3 may be preprogrammed such that no entity has to provide any input or predetermine any value. The entire system may come pre-programmed with default reticle patterns, values for periodicity of printing, and positions on print medium for printing each reticle pattern.

Figure 4:
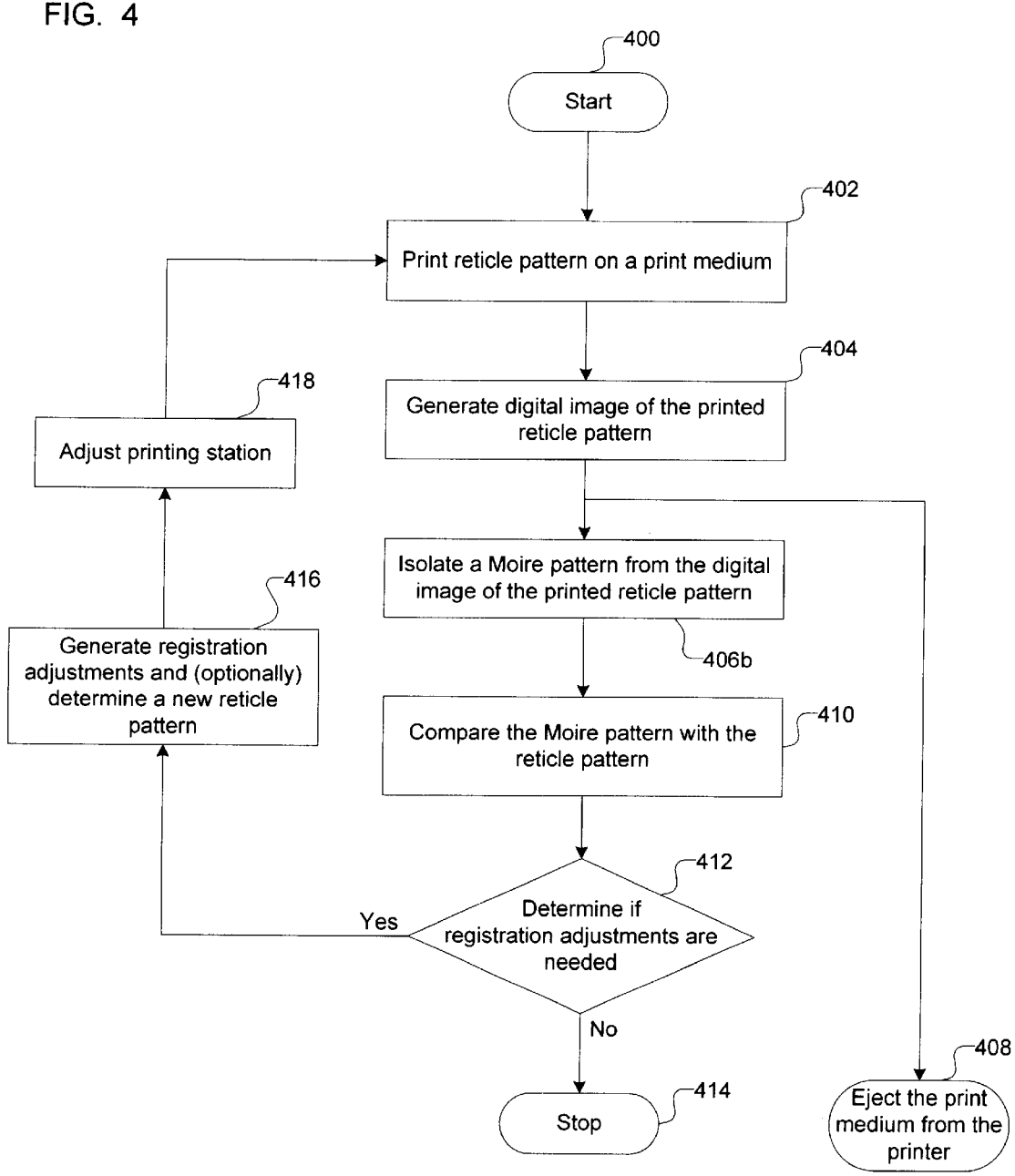
FIG. 4 illustrates logic implemented in an application for color registration of a printer in accordance with certain described implementations of the invention.

FIG. 4 illustrates logic implemented in the application 114 for color registration of the printer 100 in accordance with implementations of the invention. The application 114 starts at block 400, and the application 114 prints (at block 402) a reticle pattern 200 on one part of the print medium 108a via the printing stations 102. The application 114 may print user requested data on the other parts of the print medium 108a. The scanning device 112 scans the digital image and generates (at block 404) a digital image of the reticle pattern 202. At the conclusion of block 404, control passes in parallel to blocks 408 and 406b. At block 408, the printer 100 ejects the page. The reticle pattern may be removed by post-processing equipment such as the print media slicer 110. The post processing equipment may process a job much later than the original printing. For example, the printed medium may be re-rolled after printing, stored somewhere, and post-processed later. In alternate implementations, the reticle pattern may also be removed from the print medium 108a without using the print media slicer 110, such as for example by overprinting with the color of the print medium on the reticle pattern, or in any other manner known in the art. 5

Parallel to the execution of block 408, control proceeds to block 406b from block 404. At block 406b, the digital image analyzer unit 204 processes the digital image of the reticle pattern 202 and isiolates a digital image of a Moire pattern 206. Control proceeds to block 410, where the registration error analyzer 208 compares the digital image of the Moire pattern 206 with the reticle pattern 200. The registration error analyzer 208 determines (at block 412) if the printer 100 needs color registration adjustments. If no color registration adjustments are needed, control proceeds to block 414 and the process comes to a stop.

If at block 412, the registration error analyzer 208 determines that color registration adjustments are needed, control proceeds to block 416 where the registration error analyzer 208 generates registration adjustment control instructions 210.

Control proceeds to block 418, where the application 114 adjusts the printing stations 102. While the printing stations 102 may be adjusted in several ways, in one implementation the registration error analyzer 208 sends the registration adjustment control instructions to the controller 104 and the controller 104 adjusts the printing stations 102 by generating printing station adjustment instructions 214.

Control proceeds to block 402, and a control loop formed by blocks 404, 406b, 410, 412, 416, 418 may be repeated. Within the control loop the application 114 repeatedly adjusts the color registration of printer 100 till no further registration adjustments are needed. The application 114 may periodically execute the logic of FIG. 4 depending on how often color registration is required for the printer 100.

The printer does not have to stop printing during color registration. For example, with reference to FIG. 4, while the printing station 102 is being adjusted at block 418, the reticle patterns may be ejected (at block 408) from the printer. Alternatively, the reticle pattern may be printed in area of the media that may not be visible, may be cropped later or may be part of the desired print area. Additionally, printed media may be rejected until registration is acceptable.

Figure 5:
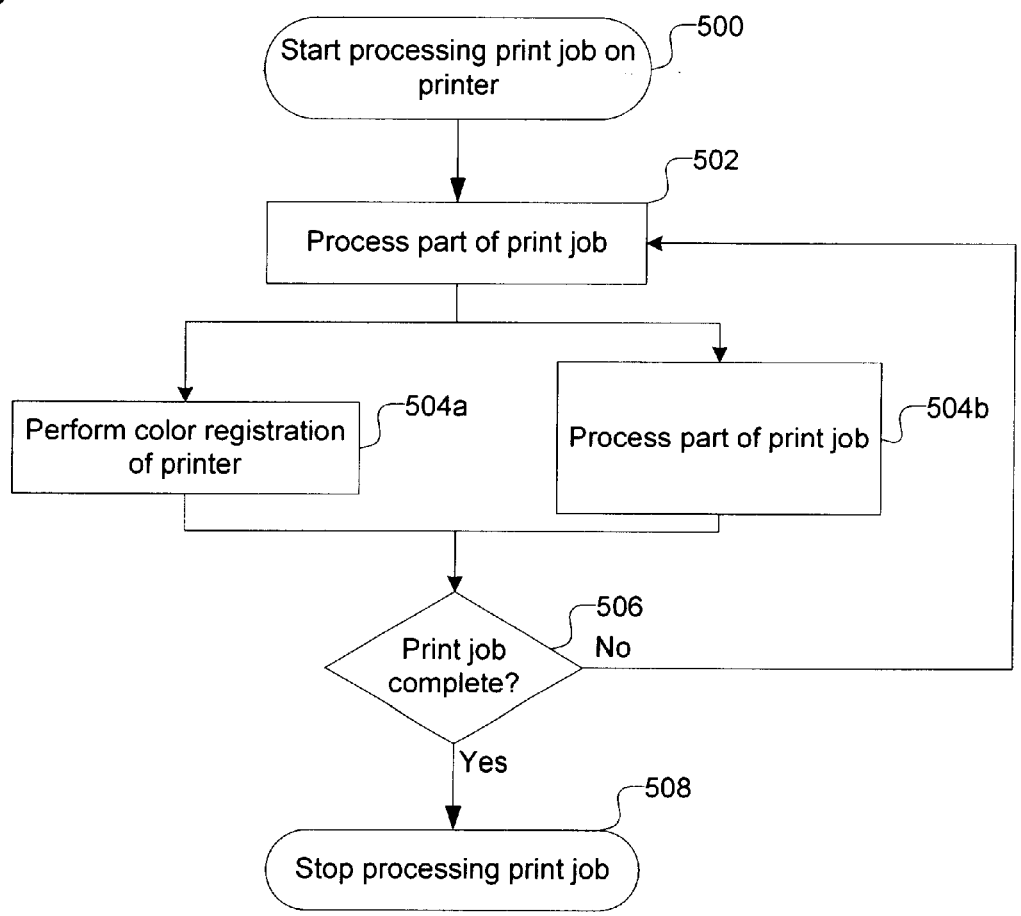
FIG. 5 illustrates logic implemented in an application to indicate how color registration of a printer is performed while printing a print job in accordance with certain described implementations of the invention.

FIG. 5 illustrates logic implemented in an application to indicate how color registration of a printer is performed while printing a print job in accordance with certain implementations of the invention. At block 500, the application 114 starts processing a print job. After the application 114 processes (at block 502) part of the print job, the application 114 performs (at block 504a) color registration of the printer 100 and optionally concurrently processes (at block 504b) part of the print job. Control proceeds to block 506, at the conclusion of either of blocks 504a or 504b, where the application 114 determines if the print job is complete. If so, the application 114 stops (at block 508) the processing of the print job. If at block 506, the application 114 determines that the print job is incomplete, control passes to block 502, and the logic of blocks 502, 504a, 504b, and 506 are repeated.

The method, system, and article of manufacture can perform color registration on a printer on-the-fly. In this way, the printer is calibrated while printing the print job, such that the reticle pattern measured on an outputted page is used to adjust the printer when outputting subsequent pages of the print job. Additionally, the periodicity of printing of reticle patterns may be adjusted depending on how frequently printing stations need to be adjusted. By performing periodic adjustments of the printing station while printing, a printer may print very long print jobs continuously without the intervention of a human operator. The Moire patterns provide enough details to adjust the printer for color registration.

Additional Implementation Details

The described techniques for color registration may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Programmable Gate Array PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

While the implementations have been described with respect to analysis of interference patterns, such as Moire patterns, analysis of other patterns similar to interference patterns, or patterns caused via phenomenon or principles similar to interference may also be used. Furthermore, the implementations analyze the Moire patterns after all the printing stations have laid down the color planes. In alternative implementations, the scanning device may scan the printed reticle patterns in between printing stations, and secure additional clues for color registration for the printer. The reticle pattern may also be printed on media to be used for registration at a later time and even at a different location.

The implementations of FIGS. 3 and 4 describe specific operations occurring in a particular order. Further, the steps may be performed in parallel as well as sequentially. In alternative embodiments, certain of the logic operations may be preformed in a different order, modified or removed and still implement preferred embodiments of the present invention. Morever, steps may be added to the above described logic and still conform to the preferred embodiments.

Variations of the implementations may be constructed for various types of printing devices. For example, in an ink-jet printer the implementation may include reticle patterns that generate Moire patterns only if the ink spots printed by an inkjet printer are small enough not to bleed into each other. In such a case the implementation would attempt to secure Moire patterns rather than eliminate Moire patterns in the digital image of the reticle pattern. Manual or automatic adjustments may be made to the ink-jet printer, if the spots are judged to be bleeding too much.

Alternatively, the presence of the Moire patterns may be used as a security feature on printed materials such as legal documents or currency, where the presence of a correct Moire pattern is used to validate the legitimacy of the printed matter. Because only the superimposed reticles, with resulting Moire pattern, will be present on the final printed matter, additional security is maintained, since counterfeiters will not have easy access to the original reticle patterns used to create the Moire.

In variations of the implementation the calibration may be performed at a later time or at a location different from the printing device.

In some printers, a color head on a printing station may comprise a multiple head array, where each head of the multiple head array may have alignment errors. In one implementation, reticle patterns that cover most of a page may be used to provide diagnostics on each head of the multiple head array. The scanning device may be movable such that the scanning device can be moved over the reticle patterns to return diagnostics as to which heads in the multiple head array are out of alignment, and to suggest a direction for correction.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for registration calibration of an operating printing device, the method comprising:

printing a test pattern on a print medium by a plurality of printing stations that each print with a color printing medium;

generating a digital image of the printed test pattern by an imaging device;

analyzing an interference pattern extracted from the digital image, wherein analyzing the interference pattern is performed between printing stations before the printing stations have printed with all colors of the printing medium; and based on the interference pattern, calibrating the printing device.

2. The method of claim 1, wherein the calibration is performed while continuing to process a print job via the operating printing device, wherein the printing, generating, analyzing, and calibrating are performed repeatedly.

3. The method of claim 1, wherein the calibration is performed at a later time than the printing, wherein the printing, generating, analyzing, and calibrating are performed repeatedly.

4. The method of claim 1, wherein the calibration is performed at a location different from the printing device, wherein the printing, generating, analyzing, and calibrating are performed repeatedly.

5. The method of claim 1, wherein the interference pattern is a Moire pattern.

6. The method of claim 1, wherein the printing device is from the group consisting of a color printer, a photocopier, a color fax machine, a laser printer, an electrostatic printer and an ink-jet printer, wherein the test pattern is a reticle pattern, wherein the print medium is selected from the group consisting of paper, transparency, fabric, plastics, labels, metal, cardboard, and container, wherein the container is selected from the group consisting of plastic, cardboard and metal, wherein the imaging device is selected from the group consisting of a scanner and a CCD camera.

7. The method of claim 1, wherein calibrating the printing device further comprises adjusting a timing of a firing of a printing station within the printing device and adjusting algorithms coupled to the printer to shift pixels during rasterization.

8. The method of claim 1, wherein simultaneously with the printing of the test pattern on the print medium, user data is printed on a same page of the print medium, and further comprising ejecting the print medium from the printing device, wherein the ejecting is performed in parallel to the analyzing and calibrating.

9. The method of claim 1, wherein the test pattern is predetermined, a periodicity of printing of the test pattern is predetermined, a position on the print medium for printing the test pattern is predetermined, the method further comprising:
  prior to printing, generating, analyzing, and calibrating:
    (i) storing the test pattern;
    (ii) storing the periodicity of printing of the test pattern; and
    (iii) storing the position on the print medium for printing the test pattern.

10. The method of claim 1, further comprising:
  repeatedly calibrating the printing device while the printing device processes a print job, by:
    (i) printing the test pattern on the print medium;
    (ii) generating a next digital image of the test pattern by the imaging device;
    (iii) analyzing a next interference pattern corresponding to the next digital image; and
    (iv) based on the next interference pattern, calibrating the printing device.

11. The method of claim 1, wherein the printing medium is from the group consisting of ink or toner, wherein the printing is with at least colors from the group consisting of cyan, magenta, black, highlight and other colors, and wherein the imaging device generates the digital image of the printed test pattern after the test pattern has been printed by at least two of the printing stations.

12. The method of claim 11, wherein the printing medium further comprises yellow.

13. The method of claim 1, wherein the printing device is an ink-jet printer, and the interference pattern is caused when a first spot printed by the ink-jet printer does not bleed onto a second spot printed by the ink-jet printer.

14. The method of claim 1, wherein the printing device prints on printed matter, wherein the printed matter is selected from the group consisting of a legal document, a currency, or a transferrable voucher.

15. The method of claim 1, wherein the interference pattern is used as a security measure to validate the legitimacy of a printed matter printed by the printing device.

16. The method of claim 1, wherein a color head of the printing device has a multiple head array, wherein test patterns cover a majority of a page of the print medium, wherein the imaging device is moveable, and wherein calibrating the printing device corrects an alignment of at least one head in the multiple head array.

17. The method of claim 1, wherein the interference pattern is associated with a multi-dimensional pattern.

18. A method for registration calibration of an operating printing device, the method comprising:
  printing a test pattern on a print medium;
  generating a digital image of the printed test pattern by an imaging device;
  analyzing an interference pattern extracted from the digital image, wherein analyzing the interference pattern further comprises:
    isolating via edge detection the interference pattern from the digital image;
    comparing the interference pattern to the test pattern; and
    based on the comparison, determining if a calibration of the printing device needs to be performed; and
  based on the interference pattern calibrating the printing device.

19. A method for registration calibration of an operating printing device, the method comprising:
  printing a test pattern on a print medium, wherein the printing device has a plurality of printing stations, wherein the test pattern is printed on the print medium by the plurality of printing stations, wherein the printing stations print with a printing medium, wherein the printing medium is from the group consisting of ink or toner, wherein the printing is with at least colors from the group consisting of cyan, magenta, black, highlight and other colors;
  generating a digital image of the printed test pattern by an imaging device, wherein the imaging device generates the digital image of the printed test pattern after the test pattern has been printed by at least two of the printing stations;
  analyzing an interference pattern extracted from the digital image, wherein analyzing the interference pattern is performed between printing stations before the printing stations have printed with all colors of the printing medium; and
  based on the interference pattern, calibrating the printing device.

20. A system for registration calibration, the system comprising:
  a printing device with a plurality of printing stations that each print with a color printing medium;
  an imaging device coupled to the printing device;
  means for printing a test pattern on a print medium by the printing device;
  means for generating a digital image of the printed test pattern by the imaging device;
  means for analyzing an interference pattern extracted from the digital image, wherein analyzing the interference pattern is performed between printing stations before the printing stations have printed with all colors of the printing medium; and
  means for calibrating the printing device, based on the interference pattern.

21. The system of claim 20, wherein the means for calibrating calibrates the printing device while the printing device continues to process a print job, wherein the means for printing, the means for generating, the means for analyzing and the means for calibrating perform printing, generating, analyzing, and calibrating repeatedly.

22. The system of claim 20, wherein the interference pattern is a Moire pattern.

23. The system of claim 20, wherein the printing device is from the group consisting of a color printer, a photocopier, a color fax machine, a laser printer, an electrostatic printer and an ink-jet printer, wherein the test pattern is a reticle pattern, wherein the print medium is selected from the group consisting of paper, transparency, fabric, plastics, labels, metal, cardboard, and container, wherein the container is selected from the group consisting of plastic, cardboard and metal, wherein the imaging device is selected from the group consisting of a scanner and a CCD camera.

24. The system of claim 20, wherein the test pattern is predetermined, a periodicity of printing of the test pattern is predetermined, a position on the print medium for printing the test pattern is predetermined, the system further comprising:
 (i) means for storing the test pattern;
 (ii) means for storing the periodicity of printing of the test pattern; and
 (iii) means for storing the position on the print medium for printing the test pattern.

25. The system of claim 20, further comprising:
 means for repeatedly calibrating the printing device while the printing device processes a print job, by:
 (i) printing the test pattern on the print medium;
 (ii) generating a next digital image of the test pattern by the imaging device;
 (iii) analyzing a next interference pattern corresponding to the next digital image; and
 (iv) based, on the next interference pattern, calibrating the printing device.

26. The system of claim 20, wherein the printing medium is from the group consisting of ink or toner, wherein the printing is with at least colors from the group consisting of cyan, magenta, black, highlight and other colors, and wherein the imaging device generates the digital image of the printed test pattern after the test pattern has been printed by at least two of the printing stations.

27. A system for registration calibration, the system comprising:
 a printing device;
 an imaging device coupled to the printing device;
 means for printing a test pattern on a print medium by the printing device;
 means for generating a digital image of the printed test pattern by the imaging device;
 means for analyzing an interference pattern extracted from the digital image; and
 means for calibrating the printing device, based on the interference pattern,
 wherein the means for analyzing the interference pattern further performs:
  isolating via edge detection the interference pattern from the digital image;
  comparing the interference pattern to the test pattern; and
  based on the comparison, determining if a calibration of the printing device needs to be performed.

28. An article of manufacture including code for registration calibration of an operating printing device, wherein the code is capable of causing operations, the operations comprising:
 printing a test pattern on a print medium by a plurality of printing stations that each print with a color printing medium;
 generating a digital image of the printed test pattern by an imaging device;
 analyzing an interference pattern extracted from the digital image, wherein analyzing the interference pattern is performed between printing stations before the printing stations have printed with all colors of the printing medium; and
 based on the interference pattern, calibrating the printing device.

29. The article of manufacture of claim 28, wherein the interference pattern is a Moire pattern.

30. The article of manufacture of claim 28, wherein the printing device is from the group consisting of a color printer, a photocopier, a color fax machine, a laser printer, an electrostatic printer and an ink-jet printer, wherein the test pattern is a reticle pattern, wherein the print medium is selected from the group consisting of paper, transparency, fabric, plastics, labels, metal, cardboard, and container, wherein the container is selected from the group consisting of plastic, cardboard and metal, wherein the imaging device is selected from the group consisting of a scanner and a CCD camera.

31. The article of manufacture of claim 28, wherein simultaneously with the printing of the test pattern on the print medium, user data is printed on a same page of the print medium, and further comprising ejecting the print medium from the printing device, wherein the ejecting is performed in parallel to the analyzing and calibrating.

32. The article of manufacture of claim 28, wherein the test pattern is predetermined, a periodicity of printing of the test pattern is predetermined, a position on the print medium for printing the test pattern is predetermined, the article of manufacture further comprising:
 prior to printing, generating, analyzing, and calibrating:
  (i) storing the test pattern;
  (ii) storing the periodicity of printing of the test pattern; and
  (iii) storing the position on the print medium for printing the test pattern.

33. The article of manufacture of claim 28, further comprising:
 repeatedly calibrating the printing device while the printing device processes a print job, by:
 (i) printing the test pattern on the print medium;
 (ii) generating a next digital image of the test pattern by the imaging device;
 (iii) analyzing a next interference pattern corresponding to the next digital image; and
 (iv) based on the next interference pattern, calibrating the printing device.

34. The article of manufacture of claim 28, wherein the printing device is an ink-jet printer, and the interference pattern is caused when a first spot printed by the ink-jet printer does not bleed onto a second spot printed by the ink-jet printer.

35. The article of manufacture of claim 28, wherein a color head of the printing device has a multiple head array, wherein test patterns cover a majority of a page of the print medium, wherein the imaging device is moveable, and wherein calibrating the printing device corrects an alignment of at least one head in the multiple head array.

36. The article of manufacture of claim 28, wherein the calibration is performed while continuing to process a print job via the operating printing device, wherein the printing, generating, analyzing, and calibrating are performed repeatedly.

37. An article of manufacture including code for registration calibration of an operating printing device, wherein the code is capable of causing operations, the operations comprising:

printing a test pattern on a print medium;

generating a digital image of the printed test pattern by an imaging device;

analyzing an interference pattern extracted from the digital image, wherein analyzing the interference pattern further comprises:

isolating via edge detection the interference pattern from the digital image;

comparing the interference pattern to the test pattern; and based on the comparison, determining if a calibration of the printing device needs to be performed; and based on the interference pattern, calibrating the printing device.

38. An article of manufacture including code for registration calibration of an operating printing device, wherein the code is capable of causing operations, the operations comprising:

printing a test pattern on a print medium wherein the printing device has a plurality of printing stations, wherein the test pattern is printed on the print medium by the plurality of printing stations, wherein the printing stations print with a printing medium, wherein the printing medium is from the group consisting of ink or toner, wherein the printing is with at least colors from the group consisting of cyan, magenta, black, highlight and other colors;

generating a digital image of the printed test pattern by an imaging device, wherein the imaging device generates the digital image of the printed test pattern after the test pattern has been printed by at least two of the printing stations, and wherein analyzing the interference pattern is performed between printing stations before the printing stations have printed with all colors of the printing medium;

analyzing an interference pattern extracted from the digital image; and based on the interference pattern, calibrating the printing device.

* * * * *